No. 762,962. Patented June 21, 1904.

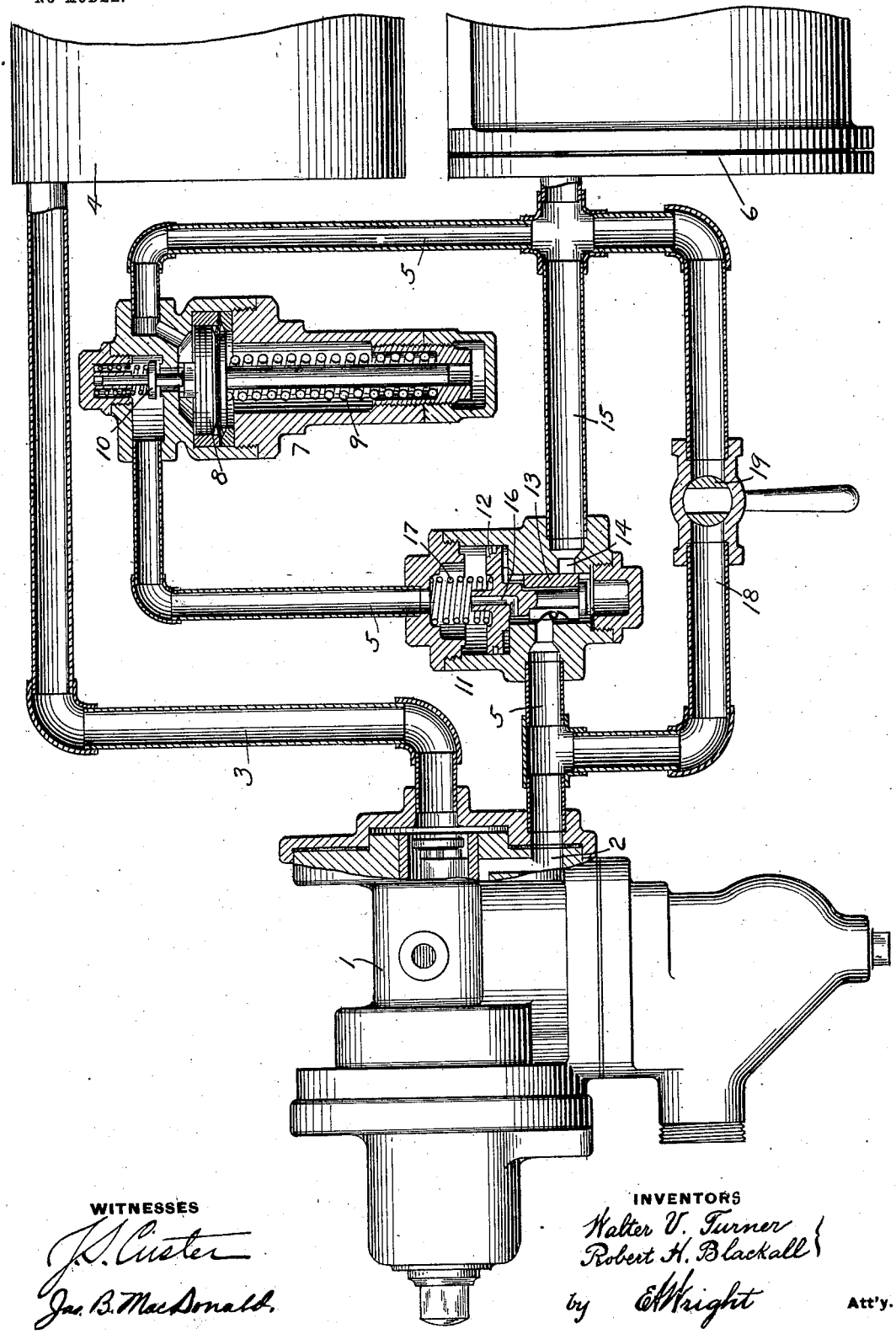

UNITED STATES PATENT OFFICE.

WALTER V. TURNER, OF WILKINSBURG, AND ROBERT H. BLACKALL, OF EDGEWOOD PARK, PENNSYLVANIA, ASSIGNORS TO THE WESTINGHOUSE AIR BRAKE COMPANY, OF PITTSBURG, PENNSYLVANIA, A CORPORATION OF PENNSYLVANIA.

LOAD-BRAKE APPARATUS.

SPECIFICATION forming part of Letters Patent No. 762,962, dated June 21, 1904.

Application filed October 20, 1903. Serial No. 177,773. (No model.)

*To all whom it may concern:*

Be it known that we, WALTER V. TURNER, residing at Wilkinsburg, and ROBERT H. BLACKALL, residing at Edgewood Park, in the county of Allegheny and State of Pennsylvania, citizens of the United States, have invented a certain new and useful Improvement in Load-Brake Apparatus, of which the following is a specification.

This invention relates to automatic fluid-pressure brake apparatus for cars, and has for its object to provide an improved device by means of which the braking power may be adjusted either for light braking, as on empty cars, or for heavy braking, as on loaded cars.

With the present capacity of freight-cars, many of which are built to carry loads equal to several times the weight of the car when empty, it is necessary in order to secure efficient braking to provide means for adjusting the braking power according to the load on the car, since, as is well known, a much greater braking pressure may be applied to the wheels of the car when heavily loaded than when empty without danger of sliding the wheels. Various devices for this purpose have heretofore been proposed, and some of these have employed a pressure-reducing valve inserted in the passage leading from the triple-valve device to the brake-cylinder for limiting the pressure therein to any desired amount for light-load braking; but such devices are subject to the objection that the passage to the brake-cylinder is more or less obstructed so as to interfere with the free venting of the train-pipe to the brake-cylinder in emergency applications of the brakes, and thus preventing the successful operation of the all-important quick-action feature of the present standard air-brake system.

According to this invention the apparatus is designed to normally give a high braking pressure—that is, the relative sizes of the auxiliary reservoir, brake-cylinder, triple-valve ports, and the degree of pressure carried are calculated to give a brake-cylinder pressure adequate for braking the car when loaded—while a regulating or reducing valve operated by the brake-cylinder pressure is interposed in the passage leading from the triple valve to the brake-cylinder for limiting the pressure admitted thereto to any desired amount, a valve-controlled by-pass being provided around said reducing-valve for cutting the same into or out of action, according as the car is empty or loaded. Another valve device, which operates only upon an emergency application of the brake, is also provided for opening a straight passage to the brake-cylinder around the reducing-valve.

The accompanying drawing illustrates this invention as applied to a car equipment of the standard Westinghouse air-brake apparatus, the additional valve devices and pipe connections comprising this improvement being shown in section.

Referring to the structure as shown in the drawing, the triple-valve device 1 is of the standard Westinghouse quick-action type, which is adapted to vent fluid under pressure from the train-pipe to the brake-cylinder in emergency applications and is provided with the usual brake-cylinder port 2 and pipe connection 3, leading to the auxiliary reservoir 4. In the passage or pipe connection 5, leading from the port 2 of the triple valve to the brake-cylinder 6, is located a pressure-reducing valve device 7, which may be of any desired construction, but is here shown of an ordinary form comprising a diaphragm-piston 8, exposed on one side to brake-cylinder pressure and subject on the opposite side to the pressure of an adjustable spring 9 for operating the spring-pressed valve 10, which controls the brake-cylinder passage.

In order to secure quick action in an emergency application of the brakes, an emergency-valve device is provided for opening a straight passage around the reducing-valve to the brake-cylinder, and although any form of means for securing this result is within the scope of this invention for the purposes of illustration we have shown a valve device 11, having a ported piston 12 therein and connected on opposite sides of the piston to the brake-cylinder passage or pipe 5, said piston being connected to slide-valve 13 for opening direct port 14, communicating with a straight passage or pipe 15, leading to the brake-cylinder around the reducing-valve.

The port 16 through the piston 12 is made of substantially the same size as the graduating-port of the triple-valve device, so that in all service applications of the brakes on empty cars the air will flow from the triple valve through this port 16 in piston 12 and through pipe 5 and the reducing-valve to the brake-cylinder without causing any movement of the piston 12, a light spring 17 being provided for normally holding the piston and valve 13 in position with the direct port 14 closed.

A by-pass or pipe connection 18, having a valve 19, is provided around the reducing-valve and emergency-valve device for opening a free communication from the triple valve to the brake-cylinder in heavy braking for loaded cars.

The operation of this improved device is as follows, the valve or cock 19 being adjusted to its closed position for giving light braking for empty cars and the spring 9 of the reducing-valve being set for the maximum pressure (thirty pounds, for instance) it is desired to admit to the brake-cylinder for light braking. When a service application of the brakes is made, air under pressure passes through port 16, pipe 5, and the reducing-valve to the brake-cylinder, and if a sufficient reduction of train-pipe pressure is made for securing a heavy service application the brake-cylinder pressure will increase until the desired maximum for which the reducing-valve is set is reached, when the valve 10 closes, preventing any further increase in the brake-cylinder pressure on the light or empty cars. Further reductions of train-pipe pressure cause an increase of brake-cylinder pressure in the usual way on all cars on which the valves 19 of the by-pass pipes 18 are open for heavy braking. When the brakes are released, the brake-cylinder pressure on empty cars raises valve 10 and passes to the atmosphere through pipe 5, port 16, and the triple-valve exhaust in the usual way. When an emergency application of the brakes is made and the triple-valve device operates to vent train-pipe air to the brake-cylinder, this air flows through the port 2 and into the passage 5 much more rapidly than it can pass through the comparatively small port 16 in piston 12. Consequently the pressure accumulating on the face of the piston causes it to move back against the light spring 17 and instantly open the direct port 14 and straight passage 15 to the brake-cylinder, thus providing a free and wide-open passage direct to the brake-cylinder in emergency applications. By this means the train-pipe air has a free access to the brake-cylinder when the triple valve is moved to emergency position and is locally vented at each triple valve with sufficient rapidity to secure the serial quick action of all the brakes throughout the train.

When the valve 19 is adjusted to its open position to establish free communication from the triple valve to the brake-cylinder through by-pass pipe 18, as on loaded cars for heavy braking, the pressure-reducing valve is cut out of action, and the brake is applied and released in the usual way.

It will now be seen that by means of this improvement a heavy braking pressure may be obtained on loaded cars, while on empty cars the maximum brake-cylinder pressure may be limited to any desired amount by the simple turning of a cock, at the same time retaining the important quick-action feature of the triple valves on empty cars on which the apparatus is adjusted for light-load braking.

Having now described our invention, what we claim as new, and desire to secure by Letters Patent, is—

1. A load-brake apparatus comprising a regulating or pressure-reducing valve for limiting the brake-cylinder pressure, and a valve-controlled by-pass around said reducing-valve.

2. A load-brake apparatus comprising a regulating or reducing valve operated by brake-cylinder pressure for limiting said pressure to a certain amount in service applications and a valve-controlled by-pass around said reducing-valve.

3. In a fluid-pressure brake the combination with a train-pipe, auxiliary reservoir, triple valve and brake-cylinder, of a reducing-valve located in the passage from the triple valve to the brake-cylinder, and a valve-controlled by-pass around said reducing-valve.

4. A load-brake apparatus comprising a reducing-valve for limiting the brake-cylinder pressure to a certain amount in service applications, and an emergency-valve device operated by an emergency application of the brakes for opening a direct passage to the brake-cylinder around the reducing-valve.

5. A load-brake apparatus comprising a reducing-valve for limiting the brake-cylinder pressure to a certain amount in service applications, and an emergency-valve device operated by the flow of air from the train-pipe to the brake-cylinder in emergency applications for opening a direct passage to the brake-cylinder around the reducing-valve.

6. In a fluid-pressure brake the combination with a train-pipe, auxiliary reservoir, triple valve and brake-cylinder, of a reducing-valve inserted in the passage from the triple valve to the brake-cylinder, and an emergency-valve device also located in said passage and operated by the flow of air from the train-pipe to open a direct passage around the reducing-valve to the brake-cylinder.

7. In a fluid-pressure brake the combination with a train-pipe, auxiliary reservoir, triple valve and brake-cylinder, of a reducing-valve located in the passage from the triple valve to the brake-cylinder, an emergency-valve device for opening a direct passage around the reducing-valve to the brake-cylinder and a valve-controlled by-pass around both of said valve devices.

8. In a fluid-pressure brake the combination with a train-pipe, auxiliary reservoir, triple valve and brake-cylinder, of a reducing-valve located in the passage from the triple valve to the brake-cylinder, a direct passage around said reducing-valve to the brake-cylinder, and a ported piston operated by the flow of air from the train-pipe to the brake-cylinder for opening said direct passage in emergency applications.

In testimony whereof we have hereunto set our hands.

WALTER V. TURNER.
ROBERT H. BLACKALL.

Witnesses:
GEO. B. SNYDER,
JAS. B. MACDONALD.